United States Patent
Yang et al.

(10) Patent No.: US 10,416,752 B2
(45) Date of Patent: Sep. 17, 2019

(54) HETEROGENEOUS NETWORK IN A MODULAR CHASSIS

(71) Applicant: Platina Systems Corp., Santa Clara, CA (US)

(72) Inventors: Frank Szu-Jen Yang, Cupertino, CA (US); Jason Luo Pang, Cupertino, CA (US); Eliot Michael Dresselhaus, San Francisco, CA (US); Dino Farinacci, San Jose, CA (US); Andreas Demetrios Bovopoulos, Los Gatos, CA (US); Mark Tehmin Yin, Cupertino, CA (US)

(73) Assignee: Platina Systems Corporation, Santa Clara, CA (US)

( * ) Notice: Subject to any disclaimer, the term of this patent is extended or adjusted under 35 U.S.C. 154(b) by 0 days.

(21) Appl. No.: 16/166,443

(22) Filed: Oct. 22, 2018

(65) Prior Publication Data

US 2019/0056776 A1 Feb. 21, 2019

Related U.S. Application Data

(63) Continuation of application No. 15/476,664, filed on Mar. 31, 2017, now Pat. No. 10,139,894.

(60) Provisional application No. 62/317,406, filed on Apr. 1, 2016.

(51) Int. Cl.
| | | |
|---|---|---|
| G06F 1/3287 | (2019.01) | |
| G06F 1/18 | (2006.01) | |
| G06F 13/36 | (2006.01) | |
| G06F 13/40 | (2006.01) | |
| H04L 12/46 | (2006.01) | |
| H04L 12/723 | (2013.01) | |
| H04L 29/06 | (2006.01) | |
| G06F 1/20 | (2006.01) | |
| G06F 1/30 | (2006.01) | |
| G06F 1/3296 | (2019.01) | |

(52) U.S. Cl.
CPC ........... *G06F 1/3287* (2013.01); *G06F 1/183* (2013.01); *G06F 1/20* (2013.01); *G06F 1/305* (2013.01); *G06F 1/3296* (2013.01); *G06F 13/36* (2013.01); *G06F 13/4068* (2013.01); *H04L 12/4633* (2013.01); *H04L 45/507* (2013.01); *H04L 69/22* (2013.01); *Y02D 10/14* (2018.01); *Y02D 10/151* (2018.01)

(58) Field of Classification Search
CPC ...... G06F 1/3287; G06F 1/183; G06F 1/3296; G06F 13/36; G06F 13/4068; H04L 12/4633; H04L 45/507; H04L 69/72
See application file for complete search history.

(56) References Cited

U.S. PATENT DOCUMENTS

| | | | |
|---|---|---|---|
| 8,077,726 B1 * | 12/2011 | Kumar | H04L 45/22 370/395.31 |
| 10,038,572 B1 * | 7/2018 | Seshadri | H04L 12/4633 |
| 2015/0092551 A1 * | 4/2015 | Moisand | H04L 12/4633 370/235 |

* cited by examiner

*Primary Examiner* — Duc C Ho
(74) *Attorney, Agent, or Firm* — Baker Botts L.L.P.

(57) ABSTRACT

In one embodiment, a system includes a number of application-specific integrated circuits (ASICs). The system also includes one or more processors coupled to the ASICs including instructions executable by the processors. The processors being operable when executing the instructions to configure the plurality of ASICs to route data packets using a standard protocol; configure the ASICs to set up a tunnel, using the standard protocol, for moving data packets from one ASIC to another of the number of ASICs; and implement a software overlay to facilitate interaction between the number of ASICs through the tunnel for moving the data packets.

20 Claims, 7 Drawing Sheets

HETEROGENEOUS NETWORK IN A MODULAR CHASSIS

PRIORITY

This application is a continuation under 35 U.S.C. § 120 of U.S. patent application Ser. No. 15/476,664, now U.S. Pat. No. 10,139,894, filed 31 Mar. 2017, which claims the benefit, under 35 U.S.C. § 119(e), of U.S. Provisional Patent Application No. 62/317,406, filed 1 Apr. 2016, each of which is incorporated herein by reference.

TECHNICAL FIELD

This disclosure generally relates to networking components.

BACKGROUND

A router (or router chassis) is a system that links computing devices to the Internet and may operate by choosing the best path for data to traverse the Internet to its destination. The router may typically include a number of modules or cards, such as for example line cards, fabric cards, and management cards. The line cards provide ingress and egress packet processing functionalities, the fabric cards are responsible for moving packets between the line cards, and the management cards execute the control plane software that is the user interface to the switch or router.

The various cards may include a number of application-specific integrated circuits (ASICs) designed for Ethernet switching and/or routing typically have Ethernet ports to interact with other Ethernet switches or routers. Each ASIC or groups of ASICs of the router may run its own Ethernet switching or routing stack. All the modules or cards are powered by a common power bus or busses within the router. For example, a router may support the use of multiple power supplies that collectivity provide a 12 volt bus that powers the modules within the router.

DESCRIPTION OF EXAMPLE EMBODIMENTS

Figure 1:
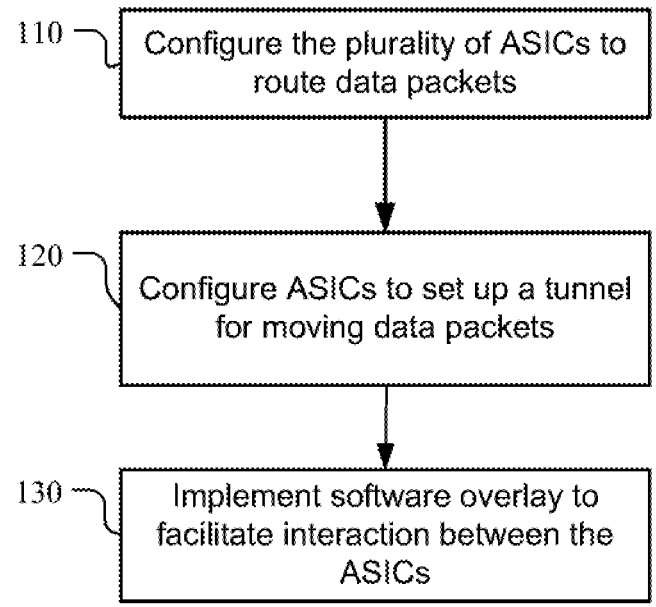
FIG. 1 illustrates an example method for transmitting data between ASICs.

High density, high throughput Ethernet switches and routers are typically built using an application specific integrated circuit (ASIC). In a modular chassis switch or router where the number of ports exceeds what a single ASIC can support, the switch or router may employ multiple ASICs that all share the same architecture. These ASICs are usually part of a family of ASICs (e.g., developed by a single vendor) that may use a proprietary protocol to communicate, pass data, or generally cause the multiple ASICs to behave like a single switch or router. Future modules (e.g., a card) for the router may be constrained to using ASICs that communicate using the same proprietary protocol in order to co-exist in the router and be backwards-compatible with earlier modules. These constraints may result in limiting the roadmap of a modular router to a single ASIC architecture.

As described above, ASICs designed for Ethernet switching and/or routing have Ethernet ports to interact with other Ethernet switches or routers. An ASIC is an integrated circuit (IC) that may be customized for a particular purpose. In the case of a router or switch, a card or module may include ASICs may support Ethernet switching and routing protocols, and they may be designed to work in a network environment with other Ethernet switches and routers that may or may not share the same underlying architecture. The switches or routers may be interconnected using external cables or fibers running standard Ethernet protocols and each switch or router may have its own control plane software that manages the switching and routing protocol stack. Although the embodiments may be described with regard to a particular type of networking component, this disclosure contemplates any suitable networking component such as for an example network switches.

Particular embodiments provide a modular router where ASIC from different vendors that use different architecture may interoperate and coexist in the router. Furthermore, an abstraction layer of software running on top of this modular chassis environment, hereinafter referred to as the platform, may cause the platform behave as a single instance of a homogeneous switch or router. ASICs are usually built to support a specific set of functions that benefit from being done in hardware vs. software, usually for speed or throughput. Different ASICs having different underlying architectures may be good in certain areas of functions and not so good in others.

In particular embodiments, the platform includes a number of heterogeneous ASICs that share standard Ethernet interfaces and protocols, but differing from one another in their underlying architecture. A network of these heterogeneous ASICs may be installed within the router or switch using Ethernet switching or routing protocols and interconnected to each other through printed circuit board (PCB) traces, cables, fiber optics, and/or silicon photonics. An abstraction layer of software may provide a uniform and unitary interface to this heterogeneous architecture, so that the set of heterogeneous ASICs appears to be a single homogeneous switch or router to higher levels of the software protocol stack. The abstraction software may also simplify the complexity of the modular, multi-chip environment, such as, by way of example and not limitation, low-level hardware monitoring and management of power, voltage, temperature, fan speed, $I^2C$ signaling (e.g., over a multi-master, multi-slave, single-ended, or serial computer bus), peripheral component interconnect express (PCIe) signaling, present signal, etc.

As an example and not by way of limitation, a heterogeneous set of ASICs inside the modular router may include using a mix of switch ASICs with shallow packet buffers and switch ASICs with deep packet buffers. Shallow and deep buffer ASICs are examples of switch/routing ASIC types that may have different underlying architectures. A data packet is a formatted unit of data carried by a packet-switched network. Packet buffers may be used at point where data packets get delayed. This delay may occur when data packets are coming into an ASIC faster than the data packets are transmitted by the ASIC. The packet buffers may queue the data packets and deliver the data packets when a burst of data has subsided. Without a packet buffer, some of the data packets would be dropped. The shallow-buffered ASICs may offer high density and better cost-per-port, while the deep-buffered ASICs may offer better tolerance to transient congestion but at a higher cost per port. As another example, the heterogeneous set of ASICs may include using a mix of fixed-featured, purpose-built ASIC and programmable ASICs that can be reprogrammed to add new features. Fixed-featured, purpose-built ASICs have fixed functions and support only those functions, while programmable ASICs are designed to be programmable so that the functions can be changed through firmware or software configurations. While each architecture has its advantages, these heterogeneous ASICs are normally only able to communicate with each other through use of a proprietary header to carry information between heterogeneous ASICs from the same family. By mixing ASICs in a single router and building an overlay, the advantages of each type of ASICs may be combined without needing multiple boxes or dealing with different operating systems.

In particular embodiments, the abstraction layer of software executed by a central process unit (CPU) of the router interfaces with the heterogeneous ASICs. The abstraction layer may configure the heterogeneous ASICs to switch or route data packets using a networking protocol, as described below. In particular embodiments, the abstraction layer may configure the heterogeneous ASICs to establish a tunnel supported by the standard networking protocols to move the data packets between the heterogeneous ASICs. The tunneling protocol allows the abstraction layer to access or provide a service that the underlying network does not support or provide directly. The tunneling protocol embeds incoming packets into an additional header that is used to carry information on how to move the packets inside the router. In other words, the packets are encapsulated within another packet format native to the protocol stack of the destination ASIC. In particular embodiments, the additional header of a network protocol (e.g., multiprotocol label switching (MPLS) or internet protocol-in-internet protocol (IP in IP), as described below) is used to tunnel packets from one ASIC to another ASIC within the chassis. The additional header may be removed prior to the data packet being transmitted out of the router or switch.

In particular embodiments, the abstraction layer of software may use MPLS to move data between one ASIC and another ASIC inside the router. MPLS is a type of data-carrying technique for high-performance telecommunication networks that directs data from one network node to the next based on short-path labels rather than long network addresses. The MPLS labels identify virtual links (paths) between distant nodes rather than endpoints. Information specific to the implementation may be embedded into the MPLS label(s). In particular embodiments, MPLS encapsulation may be used to carry data and implementation specific information from ASIC to/from the CPUs inside the chassis. As an example and not by way of limitation, the tunneling protocol may use a MPLS header to embed information such as which ports in the router received the data packet, which line card or ASIC is the destination for the data packet, or which path within the chassis the packet should take. The data packet with the modified MPLS header may then be transmitted to its destination that may be a heterogeneous ASIC.

In particular embodiments of the abstraction layer of software may use IP-over-IP using Internet protocol version 4 (IPv4) as the tunneling protocol to move data between one heterogeneous ASIC to another within the router. IPv4 is a data protocol for use on packet-switched networks and an IPv4 data packet includes a header section and a data section. In particular embodiments, the information may be embedded in the IPv4 address since the internal addresses within the router may be set by the router. This information may include, for example, which ports in the router received the data packet, which line card or ASIC is the destination for the data packet, or which path within the chassis the packet should take, as described above. In particular embodiments, one or more IPv4 headers may be modified to include the information specific to the implementation. The difference in MPLS or IP-over-IP are the size of the header, and therefore the overhead; how widely adopted the protocol is by ASIC vendors; and flexibility of the protocol to manipulate the header and embed information in it, while still allowing ASICs to parse and forward based on these headers.

In particular embodiments, data packets are redirected to CPUs within the chassis for further processing, and the MPLS header use to carry similar information plus other metadata that provides information to the abstraction layer executed on the CPU decide what to do with the data packet when it receives it. Particular embodiments may provide a tunneling method to extend the data plane from the chassis to servers/CPUs outside the chassis. A heterogeneous set of ASICs may co-exist and operate in a single chassis through use of cable backplane technology, described below, to provide a Clos-fabric connectivity of ASICs without requiring specialized fabric cards or other transport protocol to achieve the full non-blocking reachability of ASIC to ASIC. Because we know the connectivity of the ASICs inside the chassis, a static, simplified version of these protocols may be used without burdening the software with full control plane implementation of these protocols like MPLS.

Particular embodiments may use the abstraction layer of software to transmit data from an ASIC located inside the router to a CPU that resides outside the router (e.g., on a server). As an example and not by way of limitation, the data from the ASIC may be transmitted to banks of external servers for more CPU intensive processing by other software applications. In particular embodiments, MPLS encapsulation may be used to transmit data and implementation specific information from ASIC inside the chassis to CPUs outside the chassis. As an example and not by way of limitation, the additional MPLS header may be kept in the MPLS data packet and the additional MPLS header may provide the abstraction layer, executed on the CPU, additional information regarding handing of the data packet. When a standard tunneling protocol is used, the abstraction layer of software may parse the header and extract any embedded information. Although the embodiments may be described with regard to particular types of tunneling protocols, this disclosure contemplates any suitable data transfer protocol such as for example layer 2.

FIG. 1 illustrates an example method 100 for transmitting data between ASICs. The method may begin at step 110, where the processor of the router configures the ASICs to route data packets using a standard protocol. At step 120, the processor configures the ASICs to set up a tunnel, using the standard protocol, for moving data packets from one ASIC to another of the ASICs. At step 130, the processor implements a software overlay to facilitate interaction between the ASICs through the tunnel for moving the data packets. Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for transmitting data between ASICs including the particular steps of the method of FIG. 1, this disclosure contemplates any suitable method for transmitting data between ASICs including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Networking modules may be powered using a common power bus or busses. As example and not by way of limitation, a chassis or router may support multiple power supplies that collectivity provide a 12 volt bus that powers the modules within the router. A partial power-loss event may occur where some number, but not all, of the power supplies are unable to supply power to the modules (commonly known as "brownout"). When brownout occurs, the amount of power provided by the remaining operational power supplies may not be sufficient to support the current load of the modules or cards of the router, and the system power bus voltage may drop. Each module may have a voltage controller that may power-off the module when a certain under-voltage threshold is reached. As the voltage controller of the modules detects under-voltage and power-off states, the current load on the power bus is reduced until eventually reaching a level that the remaining power supplies can support. The end result is a non-deterministic mix of modules that are powered off. Even though the under-voltage threshold is typically set to the same level on each module (or type of module), the actual under-voltage threshold may be dependent on factors such as component value tolerances (i.e. resistor or capacitor tolerances), current consumption of the module during the brownout event, or electrical characteristics of the power delivery path to the module.

In particular embodiments, a processor of the router may configure a voltage-based ranking of one or more modules in order to perform a deterministic power-off of modules during a brownout event. A voltage-based ranking of modules may allow powering off lower-priority modules, while allowing higher-priority modules to remain operational. As an example and not by way of limitation, servers serving lower-priority traffic, such as internet browsing, may be connected to a particular set of line cards, while other servers serving higher-priority traffic, such as paid services, may be connected to another set of line cards. In particular embodiments, the voltage-based ranking may be set based on a user's preference. In other words, the user may pre-determine an order in which the modules power off during a brownout event. While software-based mechanisms may be implemented to detect brownout and perform priority based power-off, there is generally minimal time between a brownout event to when under-voltage detection begins to trip leaving very little time for software to react and take action.

Figure 2:
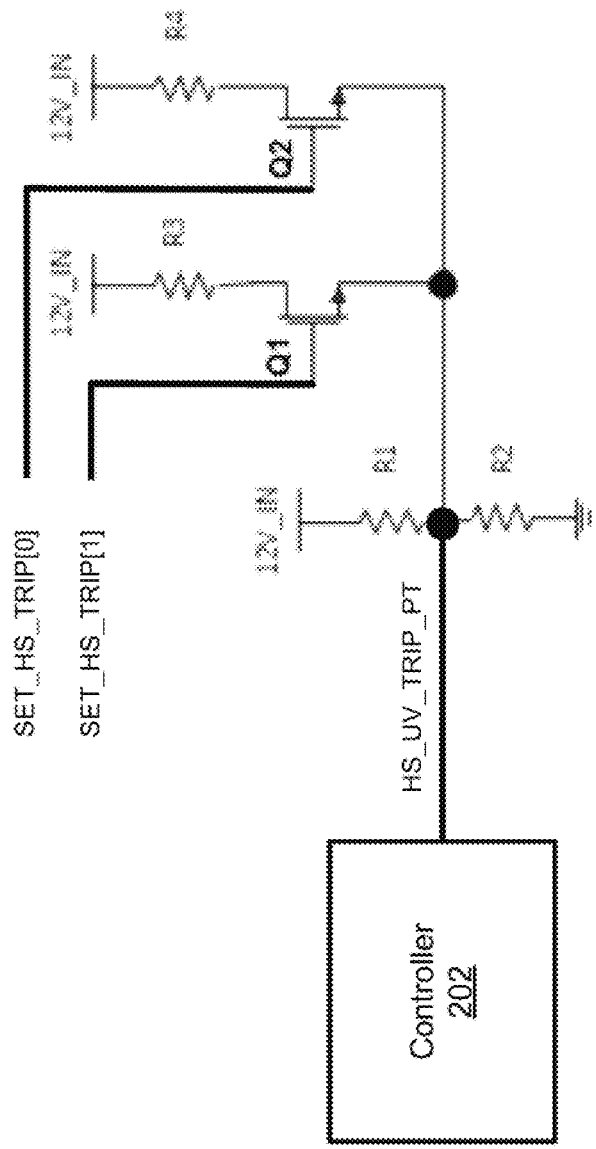
FIG. 2 illustrates an example circuit that allows multiple configurable voltage thresholds.

FIG. 2 illustrates an example circuit that allows multiple configurable voltage thresholds. Particular embodiments may perform a priority based power-off of modules within a system during a partial power loss event. Particular embodiments may provide a voltage-threshold configuration circuit 200 to configure multiple under-voltage thresholds for a pre-determined order for powering-off modules within a system during a brownout event. Each module may implement a voltage controller 202 to monitor voltage and perform powering-off the respective module. In particular embodiments, voltage-threshold configuration circuit 200 may include resistors R3 and R4 that are coupled to a voltage divider by field-effect transistors (FETs) Q1 and Q2, respectively. The coupling of either resistor R3 or R4 to the voltage divider adjusts the under-voltage threshold. FETs Q1 and Q2 may be any suitable low threshold voltage, low on-resistance transistor and the input to FETs Q1 and Q2 may be provided by the processor of the router to program each module's under-voltage threshold. As illustrated in the example of FIG. 2, output signal HS_UV_TRIP_PT is connected to a voltage monitoring input of module voltage controller 202. As illustrated in the example of FIG. 2, the power supply 12V_IN is coupled to resistors R1, R3, and R4.

As described above, resistors R1 and R2 form a voltage divider to set the under-voltage threshold. As an example and not by way of limitation, resistors R1 and R2 may have a resistance of 39Ω and 5Ω, respectively. FETs Q1 and Q2 are configured to selectively adjust the under-voltage threshold by adding resistor R3 or R4, respectively, to the voltage divider formed by resistors R1 and R2. As an example and not by way of limitation, resistors R3 and R4 may have a resistance of 300Ω and 650Ω, respectively. Input signals SET_HS_TRIP[0] and SET_HS_TRIP[1] are connected to the processor of the router and allows the processor to set the desired under-voltage threshold by turning on and turning off FETs Q1 or Q2. In this example four different thresholds may be supported and enabling the module to have a particular one of four possible power-off levels. The number of power-off levels may be scaled by adding additional combinations of FETs and resistors in parallel to FET Q1 and resistor R3. Essentially each combination of FETs and associated resistors represent an additional bit in the total number of possible states (power-off levels). In particular embodiments, the voltage-based ranking is set through setting one or more resistors to the voltage divider. The voltage-based ranking may be set through enabling/disabling one or more FETs Q1 and Q2, thereby adding/removing resistors to the effective voltage divider.

In particular embodiments, power to a particular module may be turned off when a value of output signal HS_UV_TRIP_PT is lower than the under-voltage threshold of the respective module set by the coupling of resistors R1 or resistor R2 to the voltage-divider. The value of output signal HS_UV_TRIP_PT is a function of power supply voltage 12V_IN, the resistor divider that includes resistors R1, R2, and either resistor R3 or R4, and FETs Q1, and Q2. In particular embodiments, modules set with the lowest under-voltage threshold power-off last and those with the highest under-voltage threshold power-off first during a brownout event.

Figure 3:
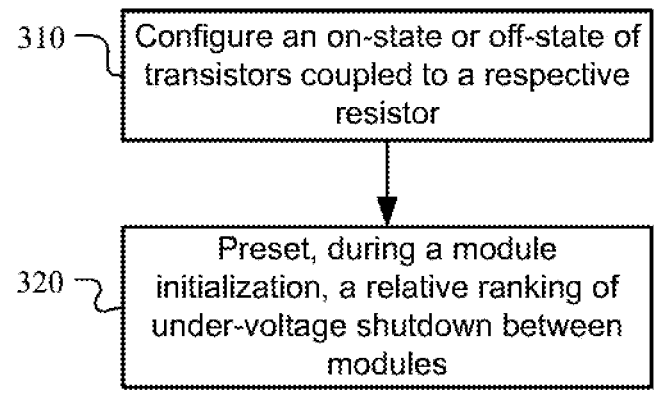
FIG. 3 illustrates an example method for configuring module power based on a voltage-based ranking.

FIG. 3 illustrates an example method 300 for configuring module power based on a voltage-based ranking. The method may begin at step 310, where the processor of the router configures, for each module, an on-state or off-state of the transistors coupled to a respective resistor of the voltage-configuration circuit. In particular embodiments, the transistors coupled to the respective resistor correspond to a bit of a plurality of a number of under-voltage thresholds, as described above. At step 320, the processor presets, during a module initialization, a relative ranking of under-voltage shutdown between the modules by setting the transistors. In particular embodiments, at least one of the networking modules has a different under-voltage threshold level relative to another one of the networking modules. Once the state of the FETs are set through input signals SET_HS_TRIP[0] and SET_HS_TRIP[1], as illustrated in the example of FIG. 2, during an initial configuration, the remaining steps may be performed through the voltage controller 202 and reacts in "hardware time" during a brownout. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for configuring module power based on a voltage-based ranking including the particular steps of the method of FIG. 3, this disclosure contemplates any suitable method for configuring module power based on a voltage-based ranking including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
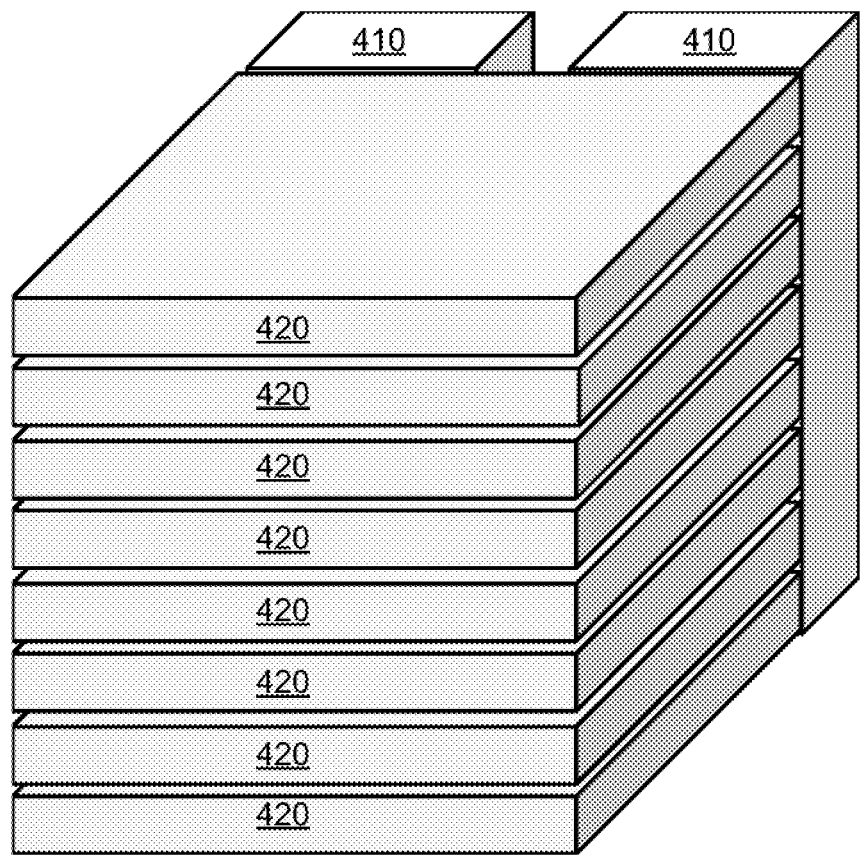
FIG. 4 illustrates an example system of networking cards with integrated line and fabric functionality.

FIG. 4 illustrates an example system of networking cards with integrated line and fabric functionality. A modular Ethernet switch or router chassis typically includes cards, fabric cards, and management cards. The line cards provide ingress and egress packet processing functionalities. The fabric cards are responsible for moving packets between the line cards, and the management card runs the control plane software that the user interfaces with the switch or router. Particular embodiments describe a platform that includes a router with fabric functionality integrated with the line cards so no separate fabric cards are used, as illustrated in the example of FIG. 4. In particular embodiments, a cable backplane 410 may be used to interconnect the ASICs on the line cards 420 to form a Clos network within the chassis. The cable backplane is used as a backbone to connect several printed circuit boards (PCBs) together to make up a complete network or computer system.

Figure 5:
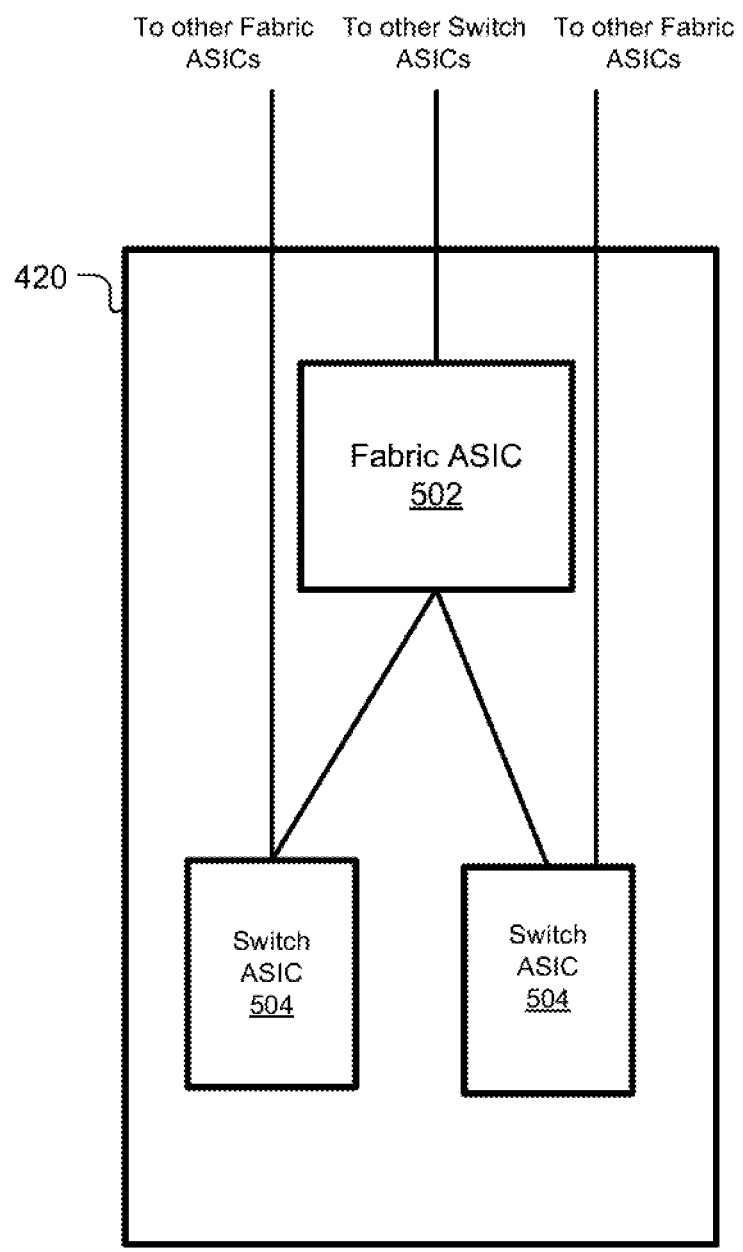
FIG. 5 illustrates a networking card with integrated line and fabric functionality.

FIG. 5 illustrates a networking card with integrated line and fabric functionality. Integrating the ASICs with switch or fabric functionality 504 into a networking (e.g., line) card 420 having ASICs line functionality 502 leads to higher power consumption per line card and higher heat density (even though overall power/heat per router remains the same). This integration of ASICs 502-504 leads to more pins being required to bring signals to/from line cards since there are more ASICs 502-504 per line card to communicate. As described below, using a cable backplane 410 and high density connectors solve the challenge of bringing large number of high speed signals to/from cards 420 with fabric functionality to one another. Particular embodiments of a modular chassis may use one or more ASICs 502-504 to perform the switching and routing hardware functionalities. ASIC 502 performs the fabric functionality (fabric ASIC), as well as ASIC 504 that performs the switching/routing functionally (switch ASIC), may both be integrated into a line card 420. In particular embodiments, fabric ASICs 502 and switch ASICs 504 are interconnected to the fabric ASICs 502 and line ASICs 504 on other line cards 420 of the router via the cable backplane to form a Clos network. A Clos network provides full connectivity between the ASICs 502-504. The Clos network provides a trade-off between blocking probability of data losses for a group of identical parallel resources versus cost/complexity.

Figures 6, 7:
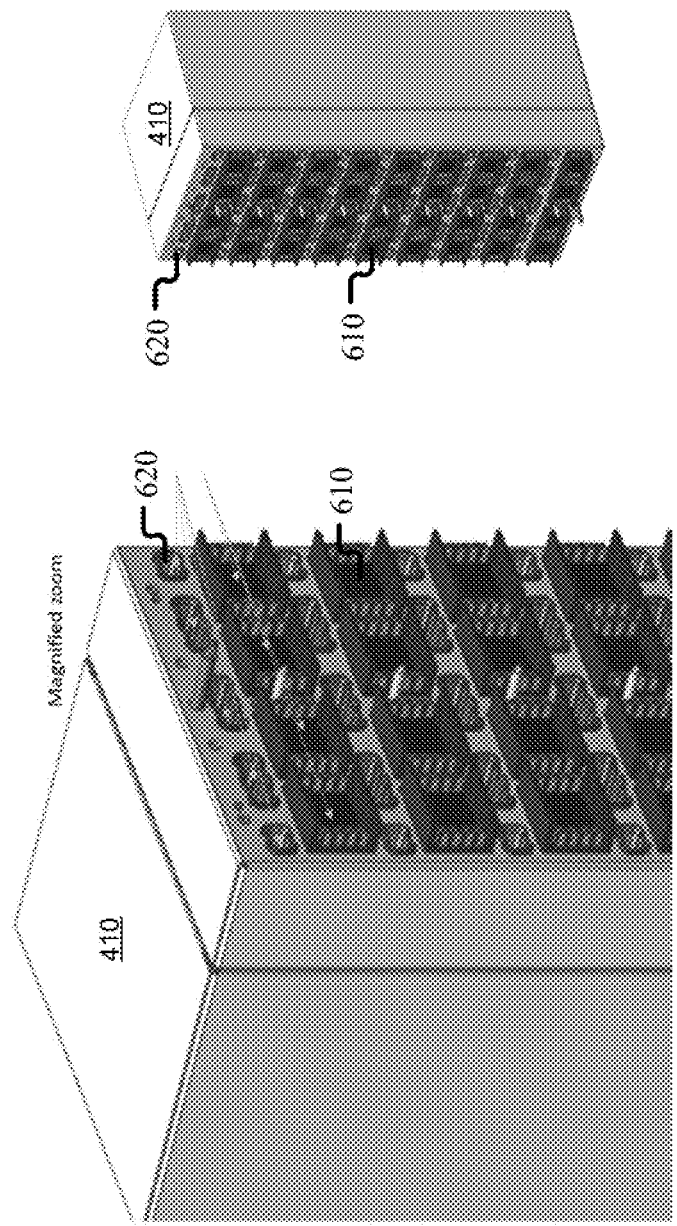
FIGS. 6-7 illustrate an example cable backplane enclosure with vent tubes.

FIGS. 6-7 illustrate an example cable backplane enclosure with vent tubes. The cable backplane 410 may include a number of copper cables (e.g., micro coaxial cables) to interconnect the various cards 420 in the router. The cables of the cable backplane may be bundled together and put inside an enclosure for easier handling, as described below. Each end of the cables terminate in electrical connectors 610 that connect the high-speed signals from one line card 420 to another and to management cards. The assembly consisting of the cables and the enclosure forms a cable backplane module 410. Cables of cable backplane 410 have much lower signal loss than PCB traces and therefore may handle higher speed for longer distances. The enclosure may block airflow similar to traditional PCB in environments where front to back or back to front airflow is desirable (e.g., within a rack mount system). In particular embodiments, the enclosure may include one or more vent tube 620 to direct air efficiently through the tray for enhanced airflow in order to cool the line cards 420 coupled to cable backplane 410. Vent tubes 620 provide guided tunnels for air to flow unimpeded through the enclosure.

Figure 8:
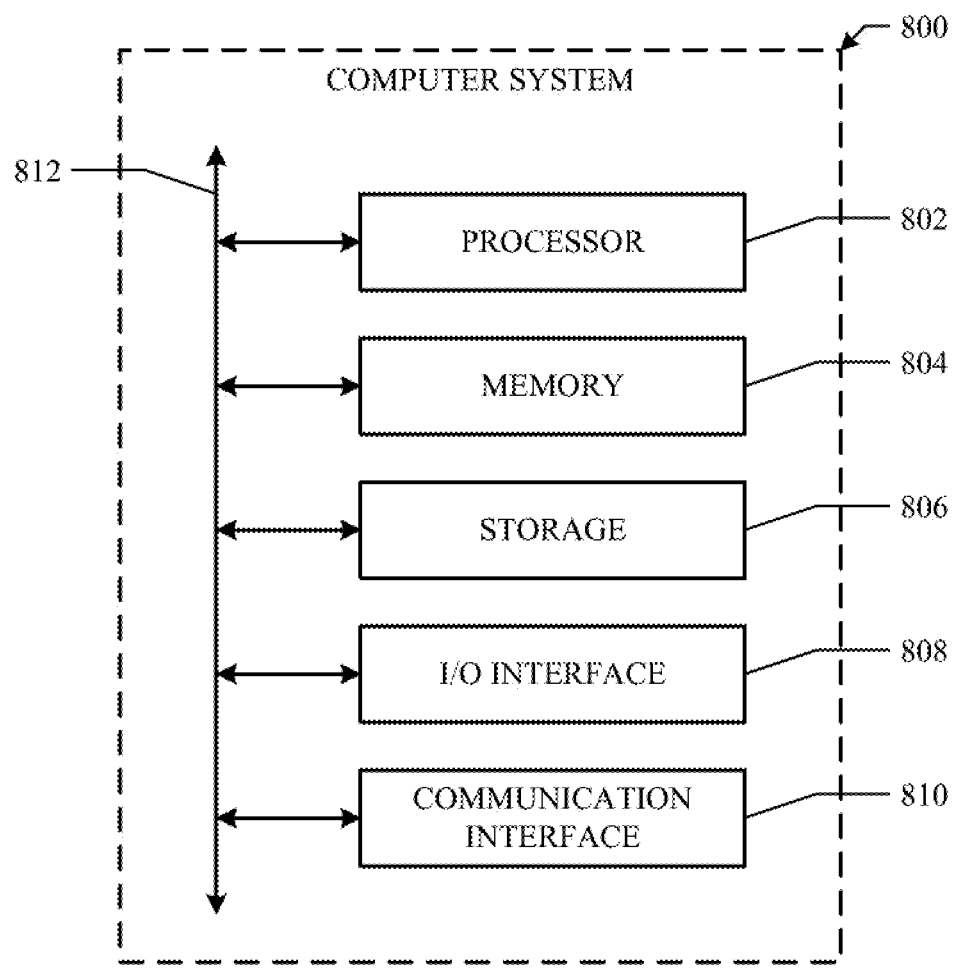
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnects.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The embodiments disclosed above are only examples, and the scope of this disclosure is not limited to them. Particular embodiments may include all, some, or none of the components, elements, features, functions, operations, or steps of the embodiments disclosed above. Embodiments according to the invention may be directed to a method, a storage medium, a system and a computer program product, wherein any feature mentioned in one claim category, e.g. method, can be claimed in another claim category, e.g. system, as well. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the aforementioned claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in any claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing system, receiving data from a transmitting application-specific integrated circuits (ASICs) having a first architecture;
   by the computing system, establishing a tunneling protocol for interfacing the first ASIC to a second ASIC having a second architecture, wherein the first and second ASICs are located within a router;
   by the computing system, using the tunneling protocol to move data from the first ASIC to a format native to the second ASIC; and
   by the computing system, transmitting the native formatted data to the second ASIC using the tunneling protocol.

2. The method of claim 1, wherein using the tunneling protocol to move the native formatted data comprises embedding the native formatted data into one or more headers of a standard protocol.

3. The method of claim 1, wherein using the tunneling protocol to move the native formatted data comprises removing one or more of headers of a standard protocol from the native formatted data prior to sending the native formatted data from the router.

4. The method of claim 1, wherein the tunneling protocol uses a standard protocol comprising multiprotocol label switching (MPLS).

5. The method of claim 4, wherein using the tunneling protocol to move the native formatted data comprises embedding the native formatted data into one or more modified MPLS labels.

6. The method of claim 5, wherein the modified MPLS labels further comprise an indicator of a port of the router that received the native formatted data, a destination for the native formatted data, or a transmission path within the router for the native formatted data.

7. The method of claim 5, wherein the modified MPLS labels further comprise information regarding handling of the native formatted data by a central processing unit (CPU).

8. One or more computer-readable non-transitory storage media embodying software that is operable when executed to:
  receive data from a transmitting application-specific integrated circuits (ASICs) having a first architecture;
  establish a tunneling protocol for interfacing the first ASIC to a second ASIC having a second architecture, wherein the first and second ASICs are located within a router;
  use the tunneling protocol to move data from the first ASIC to a format native to the second ASIC; and
  transmit the native formatted data to the second ASIC using the tunneling protocol.

9. The media of claim 8, wherein software is further operable to embed the native formatted data into one or more headers of a standard protocol.

10. The media of claim 8, wherein the software is further operable to remove one or more of headers of a standard protocol from the native formatted data prior to sending the native formatted data from the router.

11. The media of claim 8, wherein the tunneling protocol uses a standard protocol comprising multiprotocol label switching (MPLS).

12. The media of claim 11, wherein the software is further operable to embed the native formatted data into one or more modified MPLS labels.

13. The media of claim 12, wherein the modified MPLS labels further comprise an indicator of a port of the router that received the native formatted data, a destination for the native formatted data, or a transmission path within the router for the native formatted data.

14. The media of claim 12, wherein the modified MPLS labels further comprise information regarding handling of the native formatted data by a central processing unit (CPU).

15. A system comprising:
  a plurality of application-specific integrated circuits (ASICs); and
  one or more processors coupled to the ASICs comprising instructions executable by the processors, the processors being operable when executing the instructions to:
  receive data from a transmitting application-specific integrated circuits (ASICs) having a first architecture;
  establish a tunneling protocol for interfacing the first ASIC to a second ASIC having a second architecture, wherein the first and second ASICs are located within a router;
  use the tunneling protocol to move data from the first ASIC to a format native to the second ASIC; and
  transmit the native formatted data to the second ASIC using the tunneling protocol.

16. The system of claim 15, wherein processors are further operable to embed the native formatted data into one or more headers of a standard protocol.

17. The system of claim 15, wherein the processors are further operable to remove one or more of headers of a standard protocol from the native formatted data prior to sending the native formatted data from the router.

18. The system of claim 15, wherein tunneling protocol uses a standard protocol comprising multiprotocol label switching (MPLS).

19. The system of claim 18, wherein the processors are further operable to embed the native formatted data into one or more modified MPLS labels.

20. The system of claim 19, wherein the modified MPLS labels further comprise an indicator of a port of the router that received the native formatted data, a destination for the native formatted data, or a transmission path within the router for the native formatted data.

* * * * *